July 17, 1928.

C. H. SCHURR 1,677,853

MACHINE FOR HOBBING OR CUTTING GEARS

Original Filed Dec. 7, 1923    7 Sheets-Sheet 6

Inventor

Charles H. Schurr

By    Geo A Pitts

Attorney

July 17, 1928.

C. H. SCHURR 1,677,853

MACHINE FOR HOBBING OR CUTTING GEARS

Original Filed Dec. 7, 1923   7 Sheets-Sheet 7

Inventor
Charles H. Schurr
By
Attorney

Patented July 17, 1928.

1,677,853

UNITED STATES PATENT OFFICE.

CHARLES H. SCHURR, OF CLEVELAND, OHIO, ASSIGNOR TO THE LEES-BRADNER COMPANY, OF CLEVELAND, OHIO, A CORPORATION OF OHIO.

MACHINE FOR HOBBING OR CUTTING GEARS.

Continuation of application Serial No. 679,127, filed December 7, 1923. This application filed July 22, 1924. Serial No. 727,421.

This invention relates to a machine for hobbing gears.

This application is in continuation of the subject matter of my prior application, Serial No. 679,127, filed December 7, 1923.

One object of the invention is to provide an improved mechanism for feeding the work in either direction.

Another object of the invention is to provide relatively simple means for rotating the tool and work-piece in correlation to each other.

Another object of the invention is to construct an improved mounting for the tool, whereby it may be adjusted to different operative positions.

A further object of the invention is to provide an improved construction of frame and supports for the tool and the work-piece adapted to maintain them in a fixed relation during operation of the tool, whereby greater accuracy in the teeth of gears result and a relatively large amount of metal may be removed during cutting.

Other objects of the invention will be apparent to those skilled in the art to which my invention relates from the following description taken in connection with the accompanying drawings, wherein Fig. 1 is a front elevation of a machine for hobbing gears embodying my invention.

Fig. 1$^a$ is a fragmentary section on the line 1$^a$—1$^a$ of Fig. 1.

Figure 4:
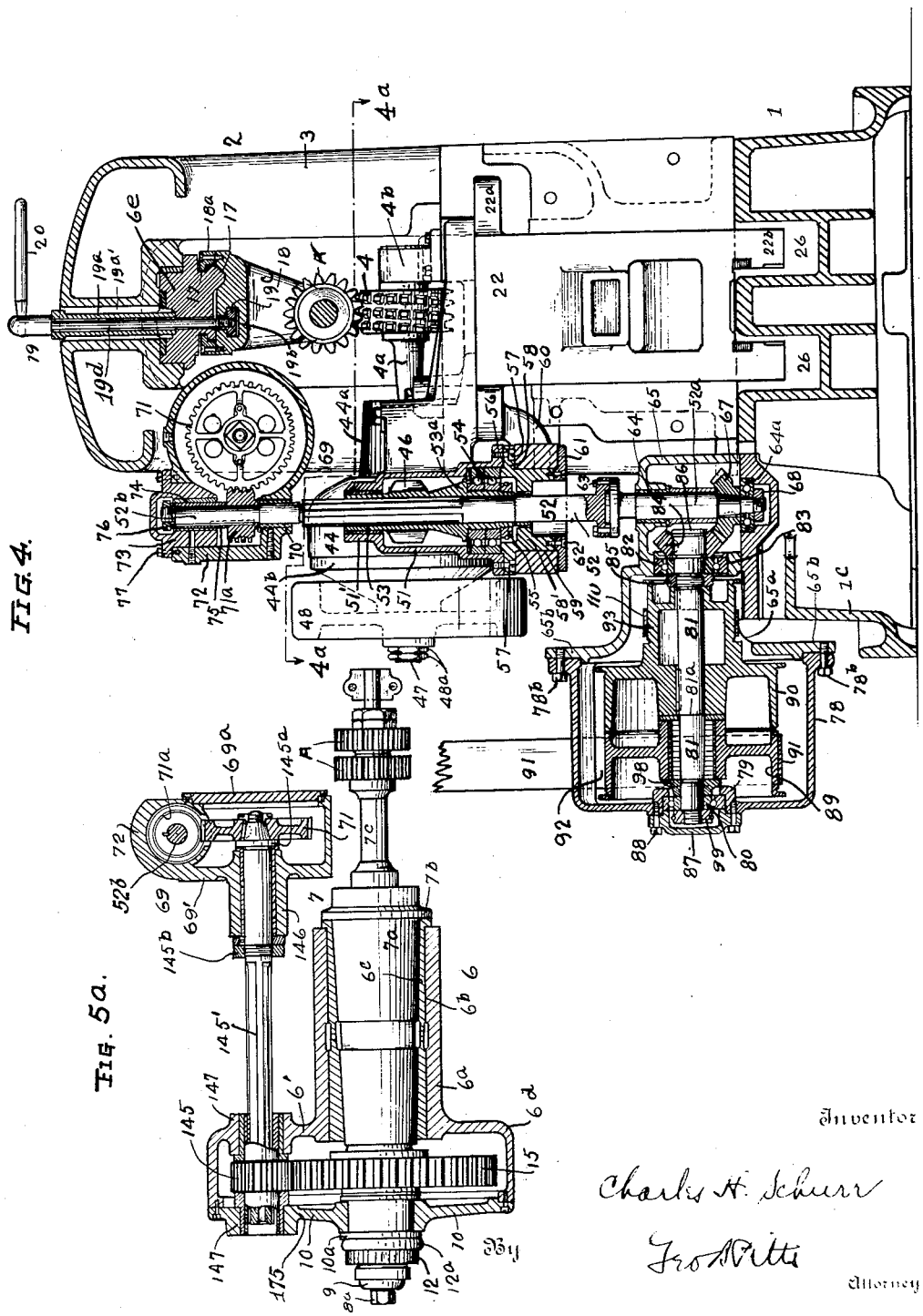
Fig. 4 is a section on the line 4—4 of Fig. 2.

Fig. 4$^a$ is a fragmentary section on the line 4$^a$—4$^a$ of Fig. 4.

Figure 5:
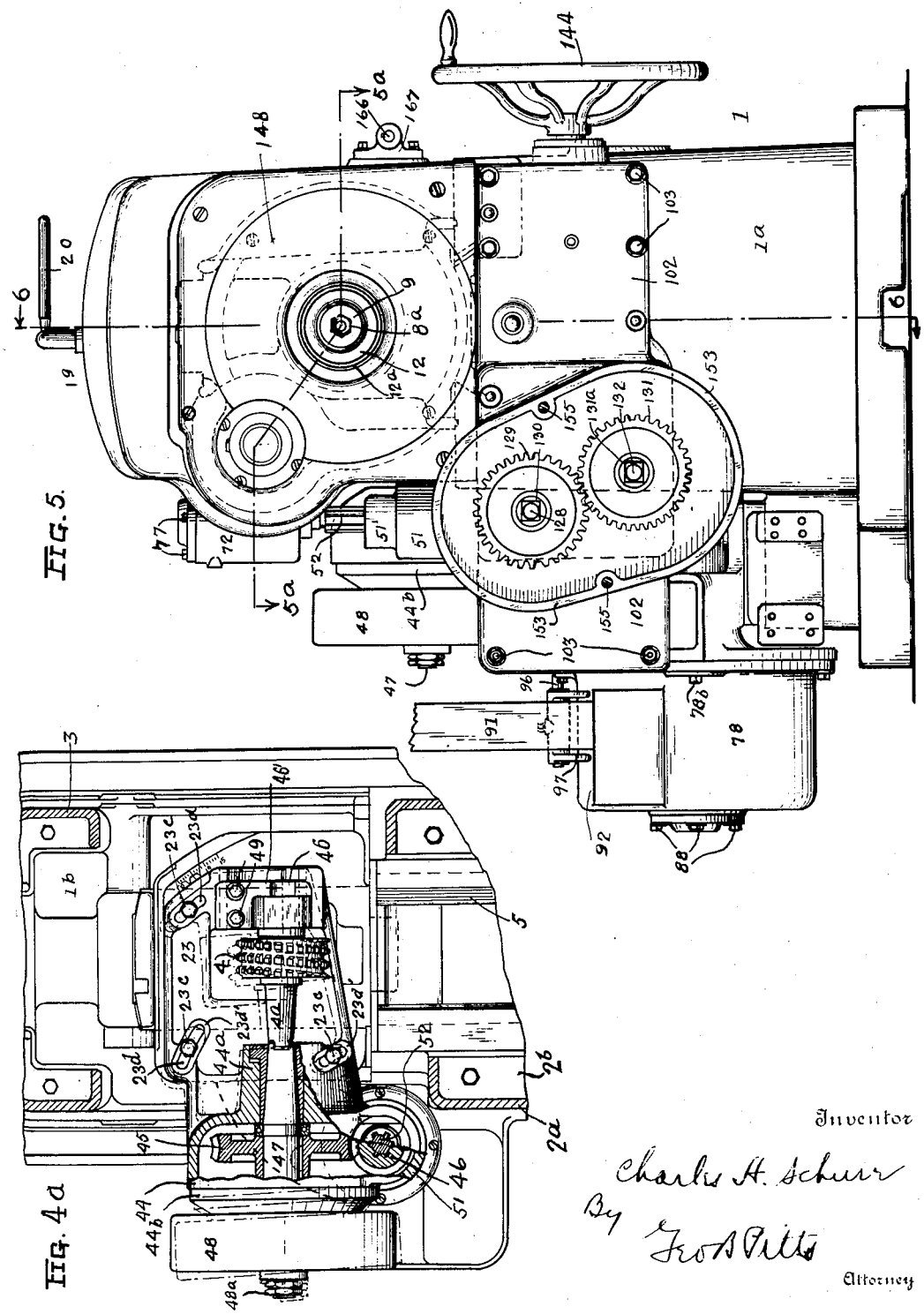

Fig. 5 is an end view of the machine, with the cover for the change gear casing removed.

Fig. 5$^a$ is a section on the line 5$^a$—5$^a$ of Fig. 5.

Figure 6:
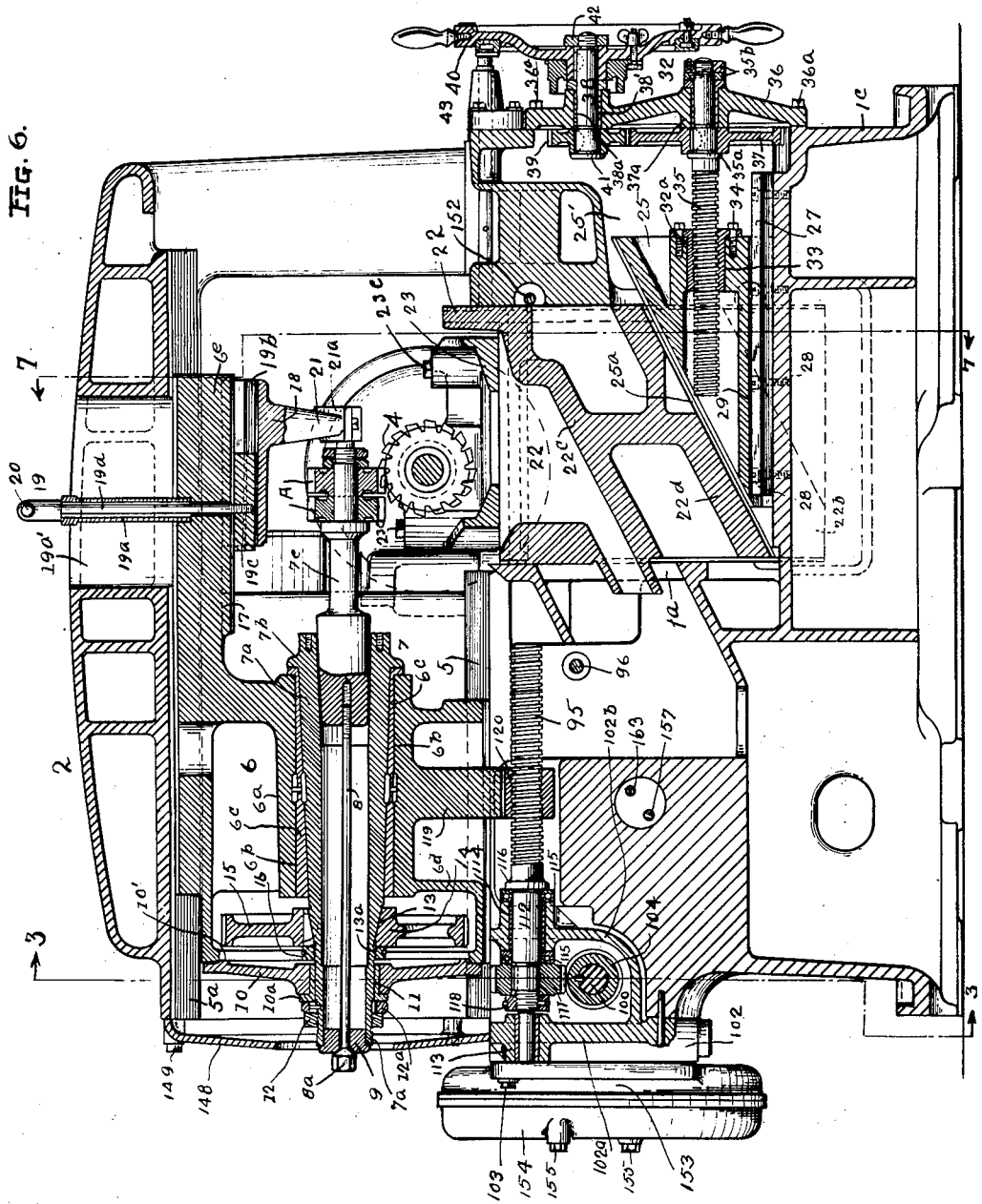

Fig. 6 is a longitudinal sectional view on the line 6—6 of Fig. 5.

Figure 7:
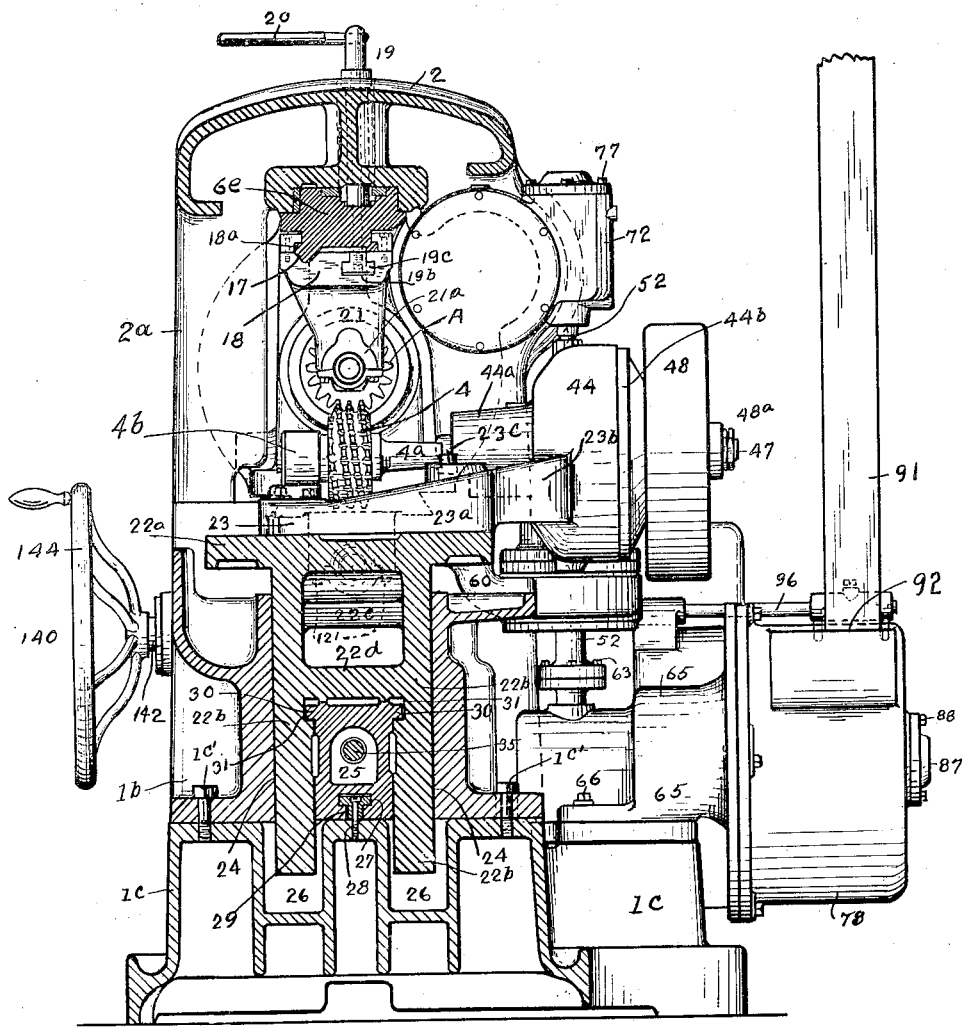

Fig. 7 is a section on the line 7—7 of Fig. 6.

Figure 1:
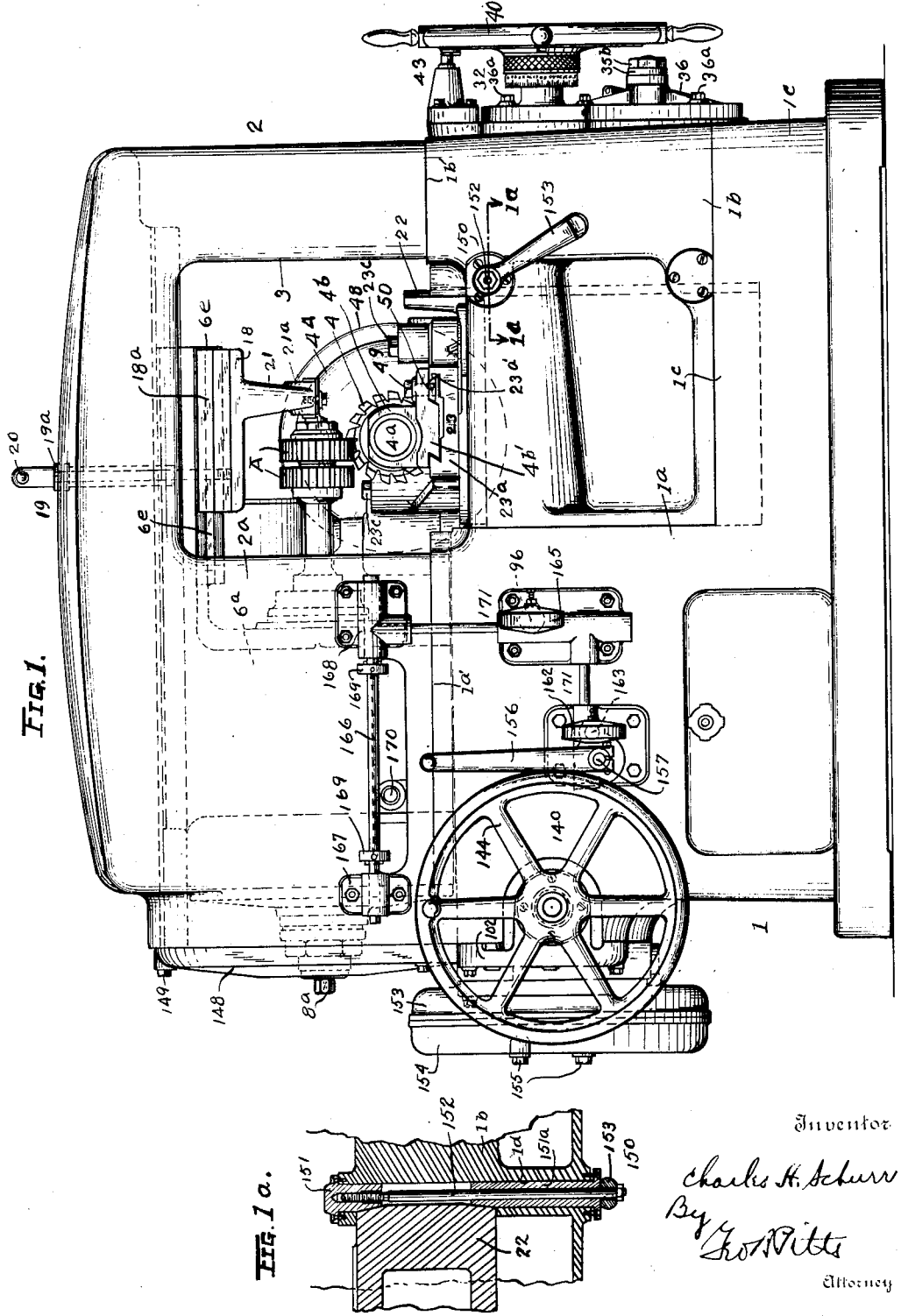
Figure 2:
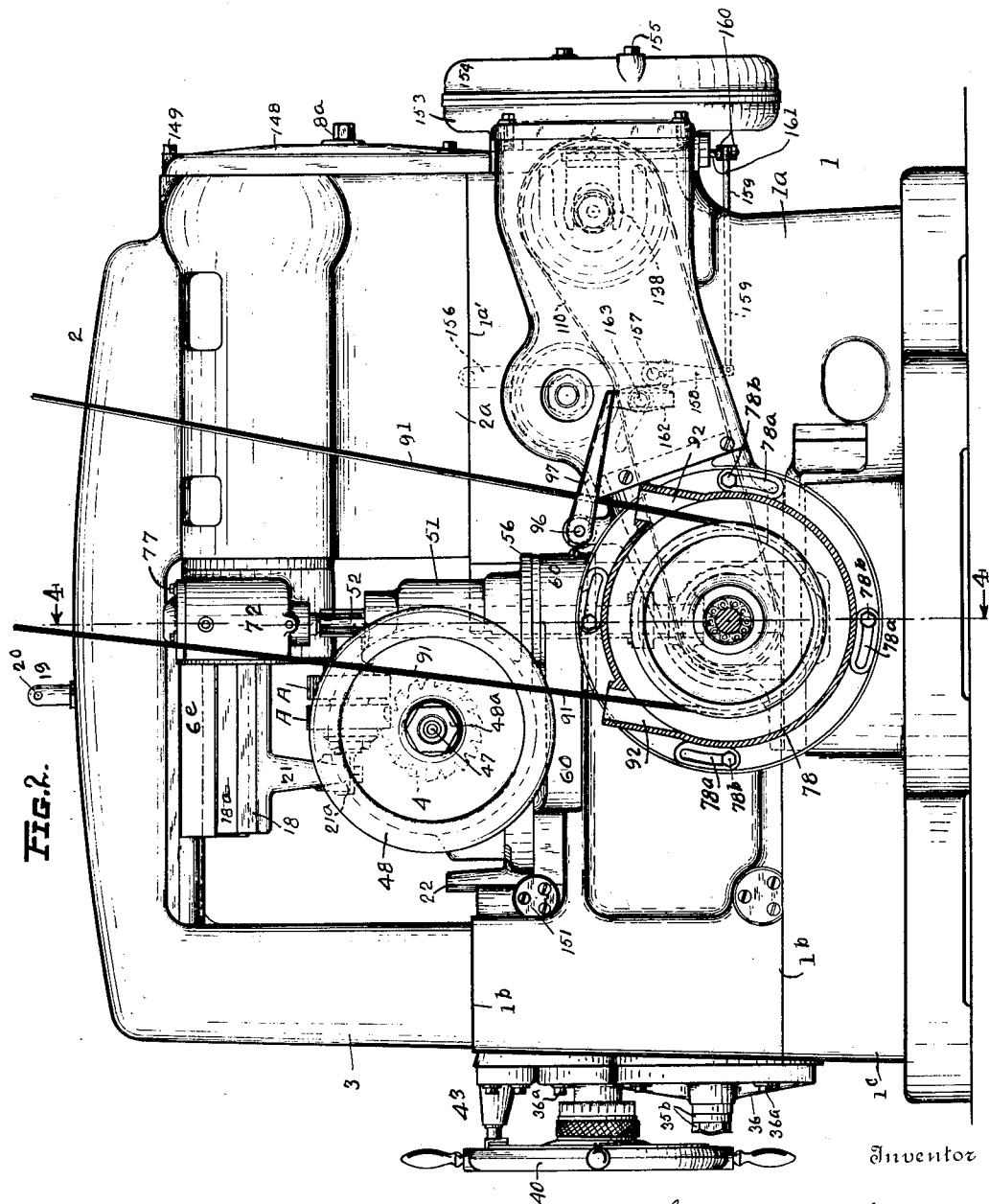
Fig. 2 is an elevational view from the opposite side of the machine.
Figure 3:
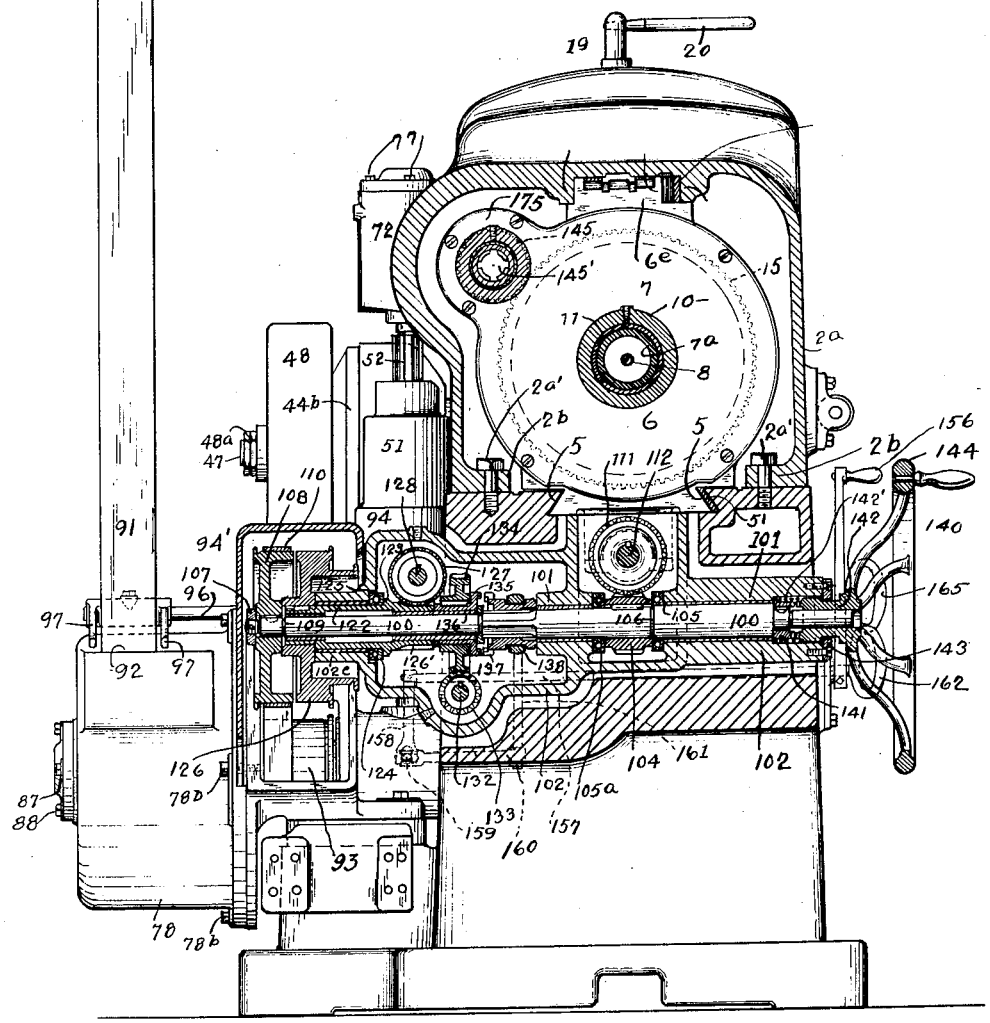
Fig. 3 is a section on the line 3—3 of Fig. 6.

In the drawings, 1 indicates a frame preferably comprising a main section 1$^a$ and a supplemental section 1$^b$. Each section 1$^a$, 1$^b$, may be cast or otherwise formed to provide supports and enclosing portions for various elements of the machine, and spaced beds 1$^{a\prime}$, 1$^{b\prime}$, respectively (Figs. 1 and 2). The main section 1$^a$ is shaped to provide a base 1$^c$ to support the supplemental section 1$^b$, which is rigidly secured to the base section by suitable bolts 1$^{c\prime}$ (see Fig. 7). 2 indicates a frame member having depending side walls 2$^a$ and depending standards 3 engaging the beds 1$^{a\prime}$, 1$^{b\prime}$, respectively, and rigidly secured thereto in any desired manner, but preferably by a plurality of cap screws 2$^{a\prime}$ fitting openings formed in the supporting beds 1$^{a\prime}$, 1$^{b\prime}$, and in inturned flanges 2$^b$ provided on the lower ends of the side walls 2$^a$ and standards 3 of the member 2 (Fig. 3). The member 2 comprises a casting preferably of arch shape in cross section extending from end to end of the frame 1. The space between each side wall 2$^a$ and adjacent standard 3 of the arched member exposes and permits access to a tool 4 and a work blank or blanks A, A, to which reference will later be made. As shown in the drawings, the arched member 2 is disposed above and is supported by and secured to the frame 1 along its sides and at its front end by the side walls 2$^a$ and standards 3. It will therefore be seen that the arched member 2 extends beyond the tool 4 and blanks A, A, to the front end of the frame 1 and, in co-operation with the bed 1$^{b\prime}$, serves to rigidly support the slide, which supports the blanks A, A, as will later be described.

The main frame 1 comprising sections 1$^a$ and 1$^b$ and the frame member 2, its walls 2$^a$ and standards 3 would in practice all be formed integrally, in one piece, for the sake of rigidity, if it were practicable to do so. Convenience of assembly and accessibility to enclosed working parts however require that the frame be made in pieces. As seen from the foregoing description, however, these pieces are so secured together that they are structurally integral, and in function and effect are equivalent to an integral or a single piece frame. The maximum of strength and rigidity so important in machines of this class, as will be described, has not heretofore been obtained because the parts of the frame relied upon to resist deflection have been adjustably connected together or have been relatively movable etc.

5, 5$^a$, indicate guides provided on the upper surface of the frame 1 and under surface of the arched member 2, respectively, and arranged to slidably support a slide 6, whereby the latter may be fed in a longitudinal direction, to feed the blank or blanks to the tool 4. 5' indicates a gib interposed between one guide face of the slide and the adjacent guide 5. The slide 6 is provided with a body portion 6$^a$ in which is formed an opening 6$^b$ for a bushing 6$^c$, an annular member 6$^d$ and an extension 6$^e$. The bushing 6$^c$ forms a bearing opening for a spindle 7, which carries the blank or blanks A, A. The bushing 6$^c$ is preferably tapered (see Figs. 5$^a$ and 6), so that the spindle 7, which also has a tapered portion, may engage therewith and be held against endwise movement in one direction. The inner end of the bushing 6$^c$ is preferably flanged to form a shoulder which engages with the end wall of the body portion 6$^a$. The spindle 7 preferably comprises a sleeve 7$^a$ having a tapered portion (already referred to) fitting the tapered bushing 6$^c$ and a flange or collar 7$^b$ that is adapted to engage the inner end of the bushing 6$^c$, and a section 7$^c$ removably connected to the sleeve 7$^a$. The connection between the sections 7$^a$ and 7$^c$ may be provided by making the inner wall of the sleeve and the inner end of the section 7$^c$ of conical shape and then forcing the latter into the sleeve. This latter operation is accomplished by means of a rod 8 extending through the sleeve and having screw threaded connection with the inner end of the spindle section 7$^c$, as shown in Fig. 6. The outer end of the rod 8 is provided with a head 8$^a$ which engages a block or cap 9 fitting into the outer end of the sleeve 7$^a$. By rotating the rod, the spindle section 7$^c$ will be forced into the sleeve and removably fixed thereto. The head 8$^a$ is shaped to receive a suitable tool, whereby it may be rotated. The spindle section 7$^c$ is shaped to form an arbor for the blanks A, A, and a shoulder against which the blanks are clamped by one or more nuts engaging screw threads provided on the outer end or free end of the spindle section 7$^c$. 10 indicates a plate engaging with and rigidly secured to the outer end of the annular member 6$^d$ of the slide 6. The inner face of the plate 10 is provided with an annular rib 10' to form a seat to engage the inner wall of the annular member 6$^d$. The plate 10 is formed with the opening 11 which forms a bearing for the outer end of the sleeve 7$^a$. The sleeve 7$^a$ is provided with screw threads to receive a nut 12, which may be tightened against the plate 10 or the flange of a bushing 10$^a$ fitting the opening 11. A washer 12$^a$ may be interposed between the nut 12 and the flange of the bushing. By proper adjustment of the nut 12, the latter will co-operate with the collar 7$^b$ to prevent endwise movement of the spindle in either direction. Between the tapered portion of the sleeve 7$^a$ and the bearing portion which rotates in the opening 11, the sleeve is provided with a conical wall 13, which forms a seat for a similarly shaped hub 14 of a gear 15, and a screw threaded portion 13$^a$, the latter being provided for the purpose of taking a nut 16, which is clamped or tightened against the gear hub 14 to secure the gear in position on its seat 13. The gear is keyed to the sleeve 7$^a$ in any desired manner, so as to drive it.

17 indicates a pair of guides provided on the extension 6$^e$ of the slide 6. 18 indicates a supporting member slidably engaging the guides 17. As shown in Fig. 4, the supporting member 18 is provided with flanged elements 18$^a$ which engage the guide walls of the guide and thus support the supporting member on the extension 6$^e$. The flanged elements are secured to the supporting member 18 by suitable cap screws. The supporting member 18 is preferably clamped in any position of adjustment by a clamping means indicated as an entirety at 19. Of these clamping means, 19$^a$ indicates a tube or sleeve supported in an opening 19$^{a'}$ formed in the upper surface of the extension 6$^e$. The tube 19$^a$ extends upwardly through an opening formed in the arched member 2, such opening being elongated (see Fig. 6) to permit movement of the tube with the extension 6$^e$ as the slide 6 is fed relative to the tool 4. 19$^b$ indicates a T-shaped slot formed in and extending longitudinally of the supporting member 18. 19$^c$ indicates a T-shaped key fitting the T-shaped slot 19$^b$. 19$^d$ indicates a rod rotatably supported in the tube 19$^a$ and provided at its lower end with screw threads which engage a screw threaded opening formed in the T-shaped key 19$^c$. The upper end of the rod 19$^d$ is provided with an enlarged portion, such as a head, which engages with the upper end of the tube so that when the rod is rotated it will operate to draw the key upwardly and thus act through the supporting member 18 to clamp the latter against the extension 6$^e$. The rod 19$^d$ may be operated by a handle 20. The supporting member 18 is provided with a depending arm 21 which carries on its lower end an arc shaped bearing member 21$^a$ with which the free end of the spindle 7 may engage, to resist the pressure of the spindle incident to the operation of the tool 4 while cutting a blank A.

It will be understood that when the blank or work piece A is fed to the tool 4 the blank will tend to move away from the tool and will exert a thrust, the resultant direction of which is in general toward the arch. From the foregoing description it will be seen that the free end of the work spindle, or that end thereof which carries the work, is supported by the supporting member 18, and the latter in turn is supported by the arch member 2. As the forward end of this arch member 2 is supported by and connected to the frame at a point beyond the free end of the work spindle, I am enabled to provide a structure which rigidly resists the lateral strains upon the work spindle incident to the cutting operation. I have found that by making the frame with an arch to take the thrust of the work piece as described and by forming this arch in effect in one piece with the main frame, there is practically no deflection of the work spindle, and greater accuracy in cutting is attained and more metal may be removed during each cut as compared to other machines of which I have knowledge.

22 indicates a knee or supporting device for a head 23 on which the tool 4 is supported. The knee 22 comprises a platform 22$^a$, depending spaced walls 22$^b$ which have a sliding engagement with walls 24, that define a space in the supplemental casting 1$^b$ to receive the knee 22, and transverse webs 22$^c$, 22$^d$, the latter serving as an incline with which a wedge, indicated as an entirety 25, engages to raise and lower the knee 22 as will be later described. That side wall of the casting 1$^a$ which extends upwardly from the base section 1$^c$ (see Figs. 1 and 6) preferably serves as a guide for the inner end wall of the knee 22 as it moves upwardly and downwardly and also as an abutment to take the thrust of the knee incident to the operation of the wedge 25. As shown in Figs. 6 and 7, the base 1$^c$ is formed with recesses 26 to provide unobstructed spaces for the lower ends of spaced walls 22$^b$ when the knee is adjusted downwardly and the walls of the casting 1$^b$ are shaped or fashioned to form an opening 25' to receive the wedge 25 when moved outwardly. The head 23, and platform 22$^a$ are formed with recesses and conduits, so that the cutting oil may be freely conveyed to some desirable point for discharge or repumping back to the tool.

27 indicates a rib adapted to serve as a guide for the wedge 25. The rib 27 is preferably of T-shape in cross section and secured to the base 1$^c$ between the recesses 26, being secured to the base by cap screws 28 (Fig. 7). The bottom wall of the wedge 25 is formed with a longitudinally extending recess or slot 29 of T-shape in cross section to receive the guide rib 27 and thus guide the wedge in its movements to adjust or move the knee 22 vertically. To insure movement of the knee 22 in both directions, the inclined face 25$^a$ of the wedge extends laterally beyond the side walls thereof, as shown at 30, and such lateral extensions fit into inclined grooves or guide ways 31 formed in the opposing faces of the walls 22$^b$. As will be understood from the foregoing description, the inclined face 25$^a$ of the wedge, when moved towards the left, as viewed in Fig. 6, will engage the web 22$^d$ and move the knee upwardly; when the wedge is moved in the opposite direction the laterally extending walls 30 will engage the lower faces of the grooves 31 and thus move the knee 22 downwardly.

By preference the inclined face 25$^a$ and the opposing face of the web 22$^d$ are provided with interengaging bearing faces to facilitate the engagement of the wedge with the knee, and the relative sliding movement therebetween without undue friction.

32 indicates as an entirety means for moving the wedge 25 in opposite directions. Of these means, 32$^a$ indicates a nut mounted in an opening 33 formed in the body portion of the wedge 25. The nut 32$^a$ has a flange which is secured to the wedge by cap screws 34. 35 indicates a feed screw fitting the nut 32$^a$. 36 indicates a plate shaped to engage the walls of the opening 25' in the supplemental frame section 1$^b$ and adapted to be secured to such walls by cap screws 36$^a$. The plate 36 is formed with an opening which serves as a bearing for the outer end of the screw 35. To prevent endwise movement of the screw 35 it is provided intermediate its ends with a collar 35$^a$, which acts against the inner face of the plate 36 to prevent movement of the screw endwise outwardly and at its outer end the screw 35 is provided with screw threads to receive one or more nuts 35$^b$ which may be adjusted or tightened so as to engage the outer face of the plate 36 and thus co-operate with the collar 35$^a$ to prevent endwise movement of the screw inwardly while permitting it to rotate in its bearing. 37 indicates a gear interposed between the collar 35$^a$ and the plate 36 or an inwardly extending hollow boss 37$^a$ provided thereon, such gear being keyed to the screw so as to operate the latter when it is driven.

38 indicates a shaft rotatably mounted in an opening 38$^a$ formed in the plate 36 and carrying at its inner end a pinion 39 which meshes with the gear 37. 40 indicates a device, such as a wheel, fixed to the outer end of the shaft 38 and adapted to rotate it. The shaft 38 is held against endwise movement in its bearing 38$^a$ by means of a head 41 provided on its inner end and engaging the pinion 39 and a nut 42 threaded on the outer end of the shaft and engaging the hub of the wheel 40 and securing the latter in engagement with the flange of a bushing 38' which is mounted in the opening 38$^a$. By rotating the wheel 40 in either direction, the screw 35 will be operated and the latter in turn, acting through the nut 32$^a$, will move the wedge in one direction or the other, according to the direction of rotation of the wheel 40.

43 indicates an entirety, an automatic stop mechanism, engaging with the wheel 40 to limit its rotation, and through it the adjustment of the wedge 25. This stop mechanism may be of any desired construction, but since it forms no part of the invention herein involved, it is thought unnecessary to describe the same in detail.

It will be understood that the wedge is adjusted by the operating means 32 to move the knee 22 upwardly or downwardly so as to support the tool 4 in proper position in accordance with the desired depth of cut, dependant upon the diameter of the blank or work-piece to be operated upon.

When the wedge is moved and the knee thereby positioned to hold the tool in working engagement with the work piece, the inclined plane construction of the wedge and knee enable great pressure to be applied by the tool against the work piece. Furthermore, the knee being held against lateral movement by the rigid knee guides and against longitudinal movement away from the work piece by the rigid wedge, the tool is forcibly and unyieldingly maintained in working engagement with the work piece. To correspond, the work piece is rigidly and unyielding held against movement away from the tool by transferring the resulting thrust of the work piece to the rigid arch of the frame through the depending arm 21. The construction is made additionally rigid to further aid in preventing yielding of the work piece under the pressure of the work tool by arranging the upper guide of the slide to lie directly in the line of this thrust of the work piece.

The head 23 comprises a supporting element 23$^a$ having a lateral extension 23$^b$ (see Fig. 7) carrying a housing 44, that encloses a worm gear 45 meshing with and driven by a worm 46 (Fig. 4$^a$), to which reference will later be made. The housing 44 is provided with oppositely extending annular walls, which terminate in annular collars, 44$^a$, 44$^b$, disposed substantially concentric with the axis of the worm gear 45, and adapted to support the opposite ends of a shaft or spindle 47. The shaft 47 is keyed to the worm gear 45 and driven thereby. The shaft 47, at its outer end, extends beyond the collar 44$^b$ and carries a suitable flywheel 48, the latter being held in position on the shaft end by one or more nuts 48$^a$. The housing 44 and collar 44$^b$ are preferably formed separately, the latter being secured to the housing in any well known manner. The inner end of the shaft 47 is formed with a conical shaped opening which removably receives the inner conical shaped end of an arbor 4$^a$ on which the tool 4 is mounted. The opposite end of the arbor 4$^a$ is rotatably mounted in a supporting element 4$^b$, the base portion 4$^{b\prime}$ of which is provided with guides engaging ways 23$^{a\prime}$ (see Fig. 1) formed in the head supporting element 23$^a$. The base portion 4$^{b\prime}$ of the supporting element 4$^b$ may be clamped in any position of adjustment along the ways 23$^{a\prime}$ by bolts 49 (Fig. 4$^a$) engaging a wedge 50, the face of which is arranged to engage one wall of one way 23$^{a\prime}$ and thus clamp the base portion in position (Fig. 1). By loosening the bolts 49 the supporting element 4$^b$ may be slid or moved outwardly out of engagement with the outer end of the arbor 4$^a$ and thus permit the latter to be removed or disengaged from the shaft 47. The housing 44 is provided with a supplemental casing section 51 disposed at one side of the housing and extending at right angles to the collars 44$^a$, 44$^b$, or the axis of the shaft 47. As shown in Fig. 4, a casing section 51 is disposed concentric to a shaft 52, to which the worm 46 is splined, and co-operates with the housing 44 to enclose the worm and the adjacent portion of the worm gear 45. The upper portion of the casing section 51 is reduced to form a bearing 51$^\prime$ for one extended end of a sleeve 53 to which the worm 46 is connected, such worm being preferably formed integrally therewith. The other end of the casing section 51 is enlarged to form a seat for anti-friction bearings 54. The other end of the sleeve 53 is provided with a collar 53$^a$ which engages the bearings 54 to support them in their seat. The lower free end of the sleeve 53 is provided with screw threads to take a nut 55 which is tightened against the lower side of the bearings 54 to support them in engagement with the collar 53$^a$ and thus prevents movement of the sleeve relative to the bearings in an axial direction. The lower end of the casing section 51 is flanged, as shown at 56, and such flange is connected by cap screws 57 to a flange 58 of a collar 58$^\prime$ which rotatably fits an opening 59 in an arm 60 formed integrally with and depending from the platform 22$^a$ of the knee 22, so that when the knee 22 is adjusted vertically, in the manner already described, it carries with it the arm 60 and the latter in turn carries with it the casing section 51, bearings 54, the sleeve 53$^a$, and the housing 44 so that the head 23 and the housing 44 and elements supported thereby are moved vertically as a unit. The collar 58$^\prime$ is formed with an axial opening through which the shaft 52 extends. The collar 58$^\prime$ is secured in the opening 59 by an annular member 61 engaging the lower end of the arm 60. The annular member 61 is secured to the collar 58$^\prime$ by a plurality of cap screws 62.

From the foregoing description it will be noted that the head 23, housing 44, casing section 51 and elements associated therewith are mounted to swing or for adjustment about the axis of the shaft 52 (see dotted lines in Fig. 4ª) to position the tool 4 at varying angles, this movement being permitted by the mounting of the collar 58' in the opening 59 and the bearings 51' and 54.

In Fig. 4ª is shown means for clamping the head 23 in its adjusted position. The clamping means preferably comprise a plurality of cap screws 23ᶜ fitting screw threaded openings in the knee platform 22ª and elongated openings 23ᵈ formed in the supporting element 23ª of the head 23 and through which the cap screws extend. The openings 23ᵈ are surrounded by upstanding walls 23ᵈ′, (integrally formed with the supporting element 23ª) that form guides for the shanks of the cap screws 23ᶜ to engage. As shown in Fig. 4ª, the heads of the screws overlap the end walls of the walls 23ᵈ′, so that when they are tightened their heads serve to rigidly clamp the head 23 to the platform 22ª. The slots or openings 23ᵈ and upstanding walls 23ᵈ′ are curved on arcs struck from the axis of the shaft 52.

The shaft 52 is preferably formed in sections, indicated at 52ª and 52ᵇ (see Fig. 4). These sections 52ª, 52ᵇ, are preferably secured together end to end by providing their adjoining ends with annular flanges and securing such flanges together by cap screws 63. The section 52ª is mounted in spaced bearings 64, 64ª, mounted in an auxiliary frame section 65 and the base 1ᶜ, respectively. The auxiliary frame section 65 is rigidly secured to the base 1ᶜ by cap screws 66 (see Fig. 7) at one side of the section 1ᵇ. The bearing 64ª is preferably constructed to take thrust of the shaft 52, the races thereof being mounted in an annular recess formed in the base 1ᶜ. The lower end of the shaft section 52ª is reduced to form a shoulder against which a bevel gear 67 is seated. The free end of the shaft section is screw threaded to take a nut 68 which is tightened against the bearing 64ª and through such bearing clamps the bevel gear 67 against the shoulder. The upper end of the shaft section 52ᵇ extends through an opening formed in a hood 69 mounted at the front end of the adjacent rear side wall 2ª, such opening being provided with a bushing 70 to form a bearing for the shaft section 52ᵇ. The hood member 69 has a body portion of cylindrical shape to house a worm gear 71 and an extended portion 72 into which the shaft section 52ᵇ extends, as just described, and carries within the extended portion 72 a worm 71ª that meshes with the worm gear 71. The upper end of the extended hood portion 72 is formed with an opening to receive a cylindrical member 73 the opening in which forms an end bearing for that portion of the shaft section 52ᵇ beyond the worm 71ª, a bushing 74 being preferably mounted within the cylindrical member to provide the bearing referred to. 75 indicates a sleeve element surrounding the shaft section 52ᵇ but within the bushing 74 and interposed between the worm 71ª and a nut 76 screw threaded on the upper or free end of the shaft section 52ᵇ and serving to clamp the worm 71ª against a shoulder provided on the shaft section above the bearing 70 therefor in the extended portion 72. The upper end of the cylindrical member 73 is closed by a cap preferably integrally formed therewith. The cap has an extended or circumferential flange to engage the end wall of the extended portion 72 surrounding the opening for the cylindrical member 73, the flange being secured thereto by a plurality of cap screws 77.

The auxiliary frame section 65 is provided with a laterally extending wall 65ª which carries an annular plate 65ᵇ to which is secured a cylindrical member 78. The outer end of the cylindrical member 78 is closed and formed with an opening the wall of which has an inturned cup member 79 which forms a seat for an anti-friction bearing 80. The bearing 80 supports one end of a driving shaft 81. The opposite end of the shaft 81 is mounted in a bearing 82 seated in an opening formed in a transverse wall 83 that is formed integrally with the walls of the auxiliary frame section 65. 84 indicates a bevel gear keyed to the inner end of the driving shaft 81 and meshing with the bevel gear 67. The bevel gear 84 is disposed on one side of the bearing 82. At the opposite side of the bearing 82, the shaft 81 is provided with screw threads to take a nut 85, which is clamped against the bearing and clamps the bevel gear 84 between the head 86 provided on the inner end of the shaft and the inner race of the bearing 82. The bearing 80 is held in its seat by a cap member 87 which is secured to the end wall of the cylindrical wall 78 by cap screws 88, 89, 90, indicate lose and fast pulleys, respectively, mounted on the shaft 81 and each arranged to be driven by a belt 91 driven in any desired manner. The side walls of the cylindrical member 78 are formed with suitable openings 92 through which the belt 91 extends. The annular flange for the cylindrical member 78 is provided with a plurality of elongated slots 78ª through which the cap screws 78ᵇ extend, the elongated slots permitting the cylindrical member 78 to be angularly adjusted to position the openings 92 in line with the runs of the belt 91 (see Fig. 2). The fast pulley 90 has an extended cylindrical section 93 which forms a pulley for driving the forward and reverse driving mechanisms indicated as an entirety at 94, 94′, for rotating a feed screw 95 in a direction to feed the work A to the tool 4 and in the opposite direction to return the work to starting position. The belt 91 may be shifted to the fast pulley 90 and from the latter to the loose pulley 89 in any desired manner, such means preferably including an endwise movable rod 96 slidably mounted in openings formed in the frame member 1ᵃ and carrying at one end a pair of arms 97 disposed at opposite sides of the belt 91. The rod 96 may be shifted in opposite directions in any desired manner, but preferably by the mechanism to be hereinafter described. The outer portion of the driving shaft 81 is reduced to form a shoulder 81ᵃ and such reduced portion is surrounded by rollers on which the hub of the loose pulley 89 rotates. The rollers and the hub of the loose pulley 89 are held in position against the shoulder 81ᵃ by a collar 98, which is held in position by a nut 99 engaging screw threads provided on the free end of the driving shaft 81, the bearing 80 being interposed between the nut and the collar so that the nut acts through the inner race of the bearing and collar to hold the elements in position on the driving shaft 81. The hubs for the fast pulley 90 and pulley 93 are spaced so that one may engage the nut 85 and the other a washer seated against the shoulder 81ᵃ and thus be held against endwise movement.

Of the driving mechanism 94', 100 indicates a transverse shaft mounted in spaced bearings 101 provided in an auxiliary frame section 102 extending across and secured to one end of the frame 1ᵃ. The auxiliary frame section 102 is shaped to provide suitable supporting walls for the bearings for the elements of the driving mechanisms as particularly shown in Figs. 3 and 6 and the walls of the frame 1ᵃ are shaped and properly recessed to receive the supporting walls constituting the auxiliary frame section 102. The frame section 102 is provided with extended portions to overlap adjacent portions of the frame 1ᵃ (see Fig. 6), so that the frame section 102 can be rigidly clamped thereto by a plurality of cap screws 103 (see Fig. 5). 104 indicates a worm interposed between suitable thrust bearings 105, 105ᵃ, engaging the opposing end walls surrounding the openings for the bearings 101 in the auxiliary frame 102, in which the transverse shaft 100 is mounted. To prevent endwise movement of the shaft 100, it is reduced to form a shoulder 106 which engages with the hub of the worm 104, which in turn engages the thrust bearing 105ᵃ that is seated against the end wall of the adjacent bearing 101. Endwise movement in the opposite direction is prevented by a nut 107 tightened against a hub of the pulley 108 keyed to a reduced portion of the shaft 100, the hub being clamped by the nut 107 against the shoulder 109 formed by such reduced portion. The pulley 108 is in line with a portion of the pulley 93 and is driven therefrom by a belt 110. The worm 104 meshes with a worm wheel 111 keyed to a shaft 112 which constitutes an extended portion of the feed screw 95. The shaft 112 is mounted in a pair of spaced bearings 113, 114 provided in spaced walls 102ᵃ, 102ᵇ, respectively, (see Fig. 6) of the auxiliary frame section 102. 115—115 indicates a pair of thrust bearings interposed between a collar 116 provided on the shaft 112 and the worm wheel 111 and the opposite end walls of the opening in the wall 102ᵇ for the bearing 114 in which the shaft 112 is mounted. The worm wheel 111 is preferably positioned on a reduced portion of the shaft 112. 118 indicates a nut or clamping collar screw threaded upon a screw threaded portion of the shaft, and serving to clamp the worm 111 against the adjacent thrust bearing 115 and coacting with the collar 116 to prevent endwise movement of the shaft in either direction. 119 indicates an arm depending from the slide 6 and carrying at its lower end a nut 120 through which the screw 95 extends. The nut 120 is preferably detachably connected to the lower end of arm 119 by a plurality of cap screws 121 (see Fig. 7). From the foregoing description it will be seen that the belt 110 drives the pulley 108 which is keyed to the shaft 100 and the shaft 100 through the worm 104 and worm wheel, 111, will drive the shaft 112 and thus rotate the feed screw 95 in one direction; since this driving connection is direct from the pulley 93 to the transverse shaft 100, the latter is rotated at a relatively high speed and I utilize such speed to move the slide 6 and through it the work A to starting position, or in the direction reversed to that in which the work is fed to the tool 4.

The mechanism 94 for feeding the work to the tool is preferably correlated to feed the work relatively slow and such elements comprise the following instrumentalities: 122 indicates a sleeve surrounding the shaft 100 and suitably mounted in bearings formed in a tubular extension 102ᶜ formed integrally with the frame section 102. The sleeve 122 is provided with an annular collar 123 which engages with a thrust bearing 124 mounted in a recess 125 formed in the end wall of the tubular extension 102ᶜ of the frame 102. The outer end of the sleeve 122 is reduced to form a shoulder and such reduced end carries a pulley 126 which is interposed between said shoulder and the hub of the pulley 108, being held against said shoulder thereby. The pulley 126 is keyed to the sleeve 122 so as to rotate it, and is disposed in line with a portion of the pulley 93 so as to be driven by the belt 110 therefrom. As shown in Fig. 3, the pulley 126 is disposed adjacent to and is of the same diameter as the pulley 108, so that the belt 110 may be shifted from the latter pulley onto it to rotate the shaft 100 in the work feeding direction and vice versa by a mechanism to be later described. 126' indicates a worm formed on the inner end of the sleeve 122 and meshing with a worm wheel 127 fixed to a shaft 128. The shaft 128 is mounted in suitable bearings (not shown) provided in the walls of the frame section 102 and carries at its outer end a change gear 129, which is removably held in position on the shaft by a nut 130. The gear 129 meshes with the change gear 131, fixed to a shaft 132, which is mounted in suitable bearings (not shown) provided in the frame section 102, the gear 131 being removably secured on the outer end of the shaft 132 by a nut 131$^a$. The inner end of the shaft 132 carries a worm 133 which meshes with a worm wheel 134 keyed to the hub of a clutch element 135. The clutch element 135 is loosely mounted on a bushing 136 surrounding the shaft 100. 137 indicates a clutch element splined to the shaft 100 and slidable thereon into engagement with the clutch element 135, such clutch element 137 being engaged by a yoke member 138 which is operated to move the clutch element 137 into engagement with the clutch element 135 and out of engagement therewith in the manner hereinafter set forth.

140 indicates as an entirety separate means for rotating the shaft 100 in either direction, whereby the slide 6 and the work A may be manually adjusted or moved in either direction. Of these means, 141 indicates a clutch member keyed to a reduced portion provided on the outer end of the shaft 100. 142 indicates a clutch member slidably and rotatably fitting the outer free end of the shaft 100 and movable into and out of engagement with the clutch element 141. The clutch member 142 is formed with an annular groove into which projects the inner edges of arc shaped elements 143 secured to the end wall of the frame section 102 in which the outer bearing 101 is provided, the groove being wide enough to permit endwise movement of the clutch element 142 into and out of engagement with the clutch element 141. 144 indicates a hand wheel secured to the outer end of the clutch element 142, whereby it may be rotated. By sliding the clutch element 142 inwardly on the shaft 100 into engagement with the clutch element 141, the hand wheel 144 will be connected to the shaft 100 and the latter may be rotated in either direction. To maintain the clutch element 142 out of engagement with the clutch element 141, I preferably enlarge the opening in the wall 102 surrounding the shaft and positioned therein a coiled expansion spring 142' abutting the end wall of the enlarged recess and the enlarged body portion of the clutch element 142, so that the spring normally tends to slide the clutch element 142 outwardly and thus maintain it out of engagement with the clutch element 141. As a result of this construction, the hand wheel 144 will remain inoperative while the shaft 100 is being rotated in either direction by the driving mechanisms 94, 94' to move the slide 6.

The work spindle 7 is rotated by the following means: the gear 15, a pinion 145 splined to the outer end of a shaft 145' and meshing with the gear 15 and the gear 71 fixed to the opposite or inner end of the shaft 145', and meshing with the worm 71$^a$ as already set forth. The inner end of the shaft 145' is mounted in a bearing 164, the walls of which are preferably formed integrally with the base plate 69' of the hood 69 (see Fig. 5$^a$). The shaft 145' is provided with a collar 145$^a$ which engages one end wall of the bearings 146 and with screw threads to take nuts 145$^b$, which may be tightened to engage the opposite end wall of the bearing, thereby preventing endwise movement of the shaft. The hood 69 may be closed by a removable cover plate 69$^a$. The outer end of the shaft 145' is mounted in a pair of aligned bearings 147, provided in arms 6', 10', extending laterally from the slide 6 and the plate 10, respectively, shown in Fig. 5$^a$.

The arms 6', 175, are formed with aligned openings to receive the bearings 147, through which the shaft 145' extends and are also spaced to receive between the opposing end walls of the aligned openings the hub of the pinion 145, so that it will move endwise of the shaft 145' with the slide 6 as the latter is fed forwardly and rearwardly, in the manner already set forth.

148 indicates a plate mounted in the rear end of the arch member 2 and secured thereto by a plurality of screws 149.

150 indicates as an entirety means for clamping the knee 22 in its adjusted position. The clamping means 150 preferably comprise a pair of clamping elements 151, 151$^a$, and devices for moving one element relative to the other. For this purpose, one element (151$^a$) is adjustably mounted in an opening 1$^d$ formed in the frame 1$^b$, whereas the other element (151) is slidably supported in the opening to move toward and from the first element, to effect a clamping of the knee. Preferably, the knee 22 and clamping elements 151, 151$^a$, are provided with co-acting inclined faces, as shown in Fig. 1$^a$, and the elements 151, 151$^a$, are formed with an opening through which extends a rod 152. The opening in the clamping element 151 is screw threaded and the free end of the rod is screw threaded to engage therewith, so that by rotating the rod, as by a handle or lever 153, the element 151$^a$ will be moved toward the element 151 and thus clamp the knee between them.

If desired the change gears 129, 131, may be mounted in a casing, preferably comprising a main section 153, formed integrally with the frame section 102, and a removable section 154 removably connected by cap screws 155 to the main section 153.

The operation of the machine is preferably controlled by the following instrumentalities: 156 indicates a lever fixed to the outer end of a rock shaft 157, which is suitably mounted in the frame section 1ª, or a plate carried thereby. 158 indicates an arm fixed to the inner end of the shaft 157 and pivotally connected to one end of a rod 159. The opposite end of the rod 159 is pivotally connected to a lever 160 that is connected to a second rock shaft 161, carrying the yoke 138 and operable to move the latter as already described. 162 indicates a handle connected to the outer end of a rod 163 which carries at its inner end a bifurcated member engaging the belt 110 (see Fig. 2). The rod 163 is mounted to slide endwise so that it may shift the belt 110 from the pulley 108 to the pulley 126 and back again. 165 indicates a handle provided on the outer end of the rod 96 and adapted to move the rod in either direction, accordingly as the shaft 81 is to be stopped or started. 166 indicates a rod slidably mounted at its opposite ends in bearings provided in brackets 167, 168, carried by the adjacent side wall 2ª. 169 indicate tappets, each adjustably fixed to the rod 166 and adapted to be engaged by a projection 170 carried by the slide 6 when the latter nears the ends of its movements so as to automatically stop the machine or the feeding movement of the slide 6 in either direction. 171—171 indicate devices, correlated with the rods 163 and 96 and controlled by the movement of the rod 166, adapted to release the rods and effect a stopping of the machine automatically. As the construction and arrangement of the stopping devices is not a part of my invention, a detail description thereof will not be necessary. That is to say, to set the machine in operation, the rods 163 and 96 are moved in one direction and set or locked by the elements 171. The slide 6 then feeds forwardly or rearwardly until one of the collars or tappets 169 is engaged and moved by the projection 170, and acting therethrough moves the rod 166. The rod in turn will actuate the adjacent element 171 which will cause the release of the rods 163 and 96 and thus effecting a stopping of the machine.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting. For example, while I have shown the tool arranged to be adjusted vertically to engage the work piece and the arch arranged vertically above the work piece to take the thrust thereof, the tool may be arranged to be adjusted otherwise, say horizontally, and the arch arranged correspondingly to take the horizontal thrust of the work piece.

What I claim is:

1. In apparatus of the character described, the combination of a frame, a driven shaft, a knee mounted in said frame to move vertically, a head supported by said knee, and swingable about the axis of said shaft, a tool spindle supported by said head and carrying a worm gear, a sleeve splined on said driven shaft and provided with a worm meshing with said worm gear, a work spindle, connections between said work spindle and said driven shaft, means for adjustably securing said head to said knee, and means for adjusting said knee.

2. In apparatus of the character described, the combination of a frame, a driven shaft, a knee mounted in said frame to move vertically, a head supported by said knee, and swingable about the axis of said shaft, a tool spindle supported by said head and carrying a worm gear, a sleeve splined on said driven shaft and provided with a worm meshing with said worm gear, a work spindle, connections between said work spindle and said driven shaft, means for adjustably securing said head to said knee, and means for adjusting said knee, said adjusting means comprising a wedge engaging said knee.

3. In apparatus of the character described, the combination of a frame, a driven shaft, a knee carried by said frame, a head supported by said knee, and swingable about the axis of said shaft, a tool spindle supported by said head and carrying a worm gear, a sleeve splined on said driven shaft and provided with a worm meshing with said worm gear, a work spindle, connections between said work spindle and said driven shaft, and means for adjustably securing said head to said knee and a fly-wheel on said tool spindle.

4. In apparatus of the class described, the combination of a frame, a frame member disposed above said frame and having side walls and standards spaced from said side walls and supported upon and secured to the opposite ends of said frame, a knee supported intermediate the ends of said frame between said standards and said side walls of said frame member, a slide movably supported between and guided by said frame and frame member, a work spindle supported by said slide, a shaft mounted in said frame, a head mounted on said knee to swing about the axis of said shaft, a tool spindle mounted on said head, gear connections between said tool spindle and shaft carried by said head, driving connections between said work spindle and said shaft, and means for feeding said slide forwardly and rearwardly.

5. In apparatus of the class described, the combination of a frame, a frame member disposed above said frame and having side walls and standards spaced from said side walls and supported upon and secured to the opposite ends of said frame, a knee supported intermediate the ends of said frame between said standards and said side walls of said frame member, a slide movably supported between and guided by said frame and frame member, a work spindle supported by said slide, a shaft mounted in said frame, a head mounted on said knee to swing about the axis of said shaft, a tool spindle mounted on said head, gear connections between said tool spindle and shaft carried by said head, driving connections between said work spindle and said shaft, means for feeding said slide forwardly and rearwardly, and means for adjusting said knee to move said head relative to the work on said work spindle.

6. In apparatus of the class described, the combination of a frame, a frame member disposed above said frame and having side walls and standards spaced from said side walls and supported upon and secured to the opposite ends of said frame, a knee supported intermediate the ends of said frame between said standards and said side walls of said frame member, a slide movably supported between and guided by said frame and frame member, a work spindle supported by said slide, a shaft mounted in said frame, a head mounted on said knee to swing about the axis of said shaft, a tool spindle mounted on said head, gear connections between said tool spindle and shaft carried by said head, driving connections between said work spindle and said shaft, means for feeding said slide forwardly and rearwardly, and a wedge engaging said knee and serving to adjust it and the tool carrying head relative to the work on said work spindle.

7. In apparatus of the class described, the combination of a frame, a frame member disposed above said frame and having side walls and standards spaced from said side walls and supported upon and secure to the opposite ends of said frame, a knee supported intermediate the ends of said frame between said standards and said side walls of said frame member, a slide movably supported between and guided by said frame and frame member, a work spindle supported by said slide, a shaft mounted in said frame, a head mounted on said knee to swing about the axis of said shaft, a tool spindle mounted on said head, gear connections between said tool spindle and shaft carried by said head, driving connections between said work spindle and said shaft, means for feeding said slide forwardly and rearwardly, means for adjusting said knee to move said head relative to the work on said work spindle, and means carried by said slide for supporting the work spindle beyond the work carried thereby.

8. In apparatus of the class described, the combination of a frame, a frame member disposed above said frame and having side walls and standards spaced from said side walls and supported upon and secured to the opposite ends of said frame, a knee supported intermediate the ends of said frame between said standards and said side walls of said frame member, guides carried by said frame and frame member, the guides on said frame member extending forwardly to a point above said knee, a slide engaging said guides and having an extension to engage the forwardly extending guides on said frame member, a work spindle on the slide, a shaft mounted in said frame, a head mounted on said knee to swing about the axis of said shaft, a tool spindle mounted on said head, gear connections between said tool spindle and shaft carried by said head, driving connections between said work spindle and said shaft, means for feeding said slide forwardly and rearwardly.

9. In apparatus of the class described, the combination of a frame, a frame member disposed above said frame and having side walls and standards spaced from said side walls and supported upon and secured to the opposite ends of said frame, a knee supported intermediate the ends of said frame between said standards and said side walls of said frame member, guides carried by said frame and frame member, the guides on said frame member extending forwardly to a point above said knee, a slide engaging said guides and having an extension to engage the forwardly extending guides on said frame member, a work spindle on the slide, a shaft mounted in said frame, a head mounted on said knee to swing about the axis of said shaft, a tool spindle mounted on said head, gear connections between said tool spindle and shaft carried by said head, driving connections between said work spindle and said shaft, means for feeding said slide forwardly and rearwardly, and means carried by said extension for supporting the work spindle beyond the work carried thereby.

10. In apparatus of the class described, the combination of a frame having upper and lower guides arranged with one substantially vertically above the other, a reciprocable slide disposed between and engaging said guides, a work spindle rotatably carried by said slide and adapted to support a work piece substantially in the plane of the guides, a tool spindle mounted on said frame, a work tool on the tool spindle in position to engage a work piece on the work spindle and exert thrust thereon substantially in the direction of one of the guides, means for moving said slide to feed the work to the tool, and means for rotating said work and tool spindles.

11. In apparatus of the class described, the combination of a frame having upper and lower guides arranged with one substantially vertically above the other, a reciprocable slide disposed between and engaging said guides, a work spindle rotatably carried by the slide and adapted to support a work piece substantially in the plane of the guides, a tool spindle mounted on the frame, a work tool on the tool spindle in position to engage the work piece and exert thrust thereon substantially in the direction of the upper guide, means for moving said slide to feed the work to the tool, the upper guide being extended to a point above the work piece, and means for rotating the work spindle and tool spindle.

12. In apparatus of the class described in combination, a frame, a frame arch structurally integral therewith, a work piece element and a work tool element under the arch, one above the other and adapted respectively to support a work piece and a work tool, a rigid member between the upper element and the arch, a movable member provided with an inclined surface for moving the lower element into working position relative to the upper element in which the tool and work piece may engage each other, and a moving member provided with an inclined surface adapted to cooperate with the inclined surface of the movable member for forcibly moving the movable member.

13. In apparatus of the class described in combination, a frame including a frame arch structurally integral therewith, a tool spindle, a tool on the spindle under the arch, a reciprocable slide, a guide for the slide on the arch, a work spindle on the slide adapted to move therewith having a free end adapted to receive a work piece under the arch and above the tool, and a rigid member extending from the slide and movable therewith to engage the free end of the work spindle.

14. In apparatus of the class described in combination, a frame including a frame arch structurally integral therewith, a tool spindle, a tool on the spindle under the arch, a reciprocable slide, a guide for the slide on the arch, a work spindle on the slide adapted to move therewith and support a work piece under the arch and above the tool, and a rigid member extending from the slide and movable therewith to engage the work spindle.

15. In apparatus of the class described in combination, a frame including a frame arch structurally integral therewith, a tool spindle, a tool on the spindle under the arch, a reciprocable slide, a guide for the slide on the arch, a work spindle on the slide adapted to move therewith, having a free end adapted to support a work piece under the arch and above the tool, a rigid member extending from the slide and movable therewith to engage the free end of the work spindle to transfer to the arch the thrust of a work piece when in working engagement with the work tool.

16. In apparatus of the class described in combination, a frame including a frame arch structurally integral therewith, a knee adjustable vertically on the frame, a tool spindle on the knee, a tool on the tool spindle under the arch, a reciprocable slide, a guide for the slide on the arch, a work spindle on the slide adapted to move therewith and to support a work piece under the arch and above the tool, a rigid member extending from the slide and movable therewith to engage the work spindle and to transfer to the arch the thrust of a work piece when the tool is moved by the knee into working engagement therewith.

17. In apparatus of the class described, the combination of a frame including a frame arch structurally integral therewith, a reciprocable slide on the frame, a guide for the slide on the arch, a work spindle on the slide adapted to support a work piece, a tool spindle on the frame, a tool on the tool spindle in position to engage a work piece, the guide, slide, work spindle and work tool being so arranged that the direction of thrust of the work spindle, when a work piece thereon is engaged with the work tool, is along a line passing through the guide and into the arch.

18. In apparatus of the class described in combination, a frame including a frame arch structurally integral therewith, a knee guide, a knee adapted to slide on the guide and having an inclined face, a tool spindle on the knee, a tool on the tool spindle under the arch, a work spindle adapted to support a work piece under the arch and above the tool, a movable member having an inclined face engaging the inclined face of the knee, means for moving the movable member to adjust the knee on the guide to bring the tool into working engagement with a work piece and rigidly hold it in said position, a rigid member engaging the work spindle and adapted to transfer to the arch the thrust of the work spindle when the work tool is in working engagement with a work piece on the spindle.

19. In apparatus of the class described in combination, a frame including a frame arch structurally integral therewith, a knee guide, a knee adapted to slide on the guide and having an inclined face, a reciprocable slide on the frame, a guide for the slide on the arch, a work spindle on the slide adapted to support a work piece, a rigid member on the slide movable therewith and engaging the work spindle, a tool spindle on the knee, a tool on the tool spindle for engaging the work piece, a movable member having an inclined face engaging the inclined face of the knee, means for moving the movable member to adjust the knee on the guide to bring the tool into working engagement with the work piece and rigidly hold it in said position, the slide, the guide therefor, the work spindle and the work tool and rigid member being so arranged that the direction of thrust of the work spindle, when the tool is in working engagement with the work piece thereon, is along a line through the slide guide and into the arch.

20. In apparatus of the class described in combination, a frame, a work spindle adapted to support a work piece, a tool spindle and a tool thereon, means for rotating the spindles, spindle adjusting means for bringing the tool into working position relative to a work piece, said adjusting means including a knee by which one of the spindles is supported, guides on the frame within and on which the knee is slidably mounted, an inclined surface on the knee, a movable member on the frame having a corresponding inclined surface engaging the inclined surface on the knee, and means for moving the movable member.

21. In apparatus of the class described in combination, a frame including a frame arch, a knee guide, a knee adapted to be moved adjustably on the guide and having an inclined face, a movable knee adjusting member on the frame having a corresponding inclined face engaging the inclined face of the knee, means for moving the movable member to adjust the knee on the guide, a head on the knee, a rotatable tool spindle on the head adapted to support a tool, a worm wheel on the spindle, a driving shaft, a worm on the driving shaft meshing with said worm wheel for driving the tool spindle, the head being adjustable on the knee about the axis of the driving shaft, a rotatable work spindle adapted to support a work piece, a supplemental shaft, a worm wheel on the supplemental shaft, a worm on the driving shaft meshing therewith for driving the supplemental shaft, driving connections between the supplemental shaft and work spindle for driving the work spindle, a reciprocable slide adapted to carry and rigidly support the rotatable work spindle, a guide for the slide on the frame, the knee, the head, tool spindle, work spindle, slide guide and arch being so aligned that the knee may be adjusted to forcibly engage the tool with the work piece and that the direction of the resultant thrust of the work spindle will be along a line through the slide and guide into the arch.

22. In apparatus of the class described, a main frame, a slide reciprocatably mounted on the frame, a work spindle extending out of the slide, supported thereon, and adapted to support a work piece on its free end, a tool spindle on the frame, a tool on the tool spindle below the work piece, operative mechanism to move the tool into engagement with the work piece to work it thereby exerting a thrust on the work piece having a large component vertically upward, a guide for the slide in a horizontal plane below the work spindle, a guide for the slide in a horizontal plane above the work spndle, the slide having an extension thereon, movable therewith, arranged in the general direction of the work spindle, and slidably supported on said upper guide, a structural frame member rising from the main frame and carrying said upper guide, and a rigid strut member depending from said slide extension and supportingly engaging the free end of the work spindle and adapted to transmit said thrust into said slide extension and thence through said upper guide into said frame member.

23. In apparatus of the class described, a main frame, a slide reciprocatably mounted on the frame, a work spindle extending out of the slide, supported thereon, and adapted to support a work piece on its free end, a tool spindle on the frame, a tool on the tool spindle below the work piece, operative mechanism to move the tool into engagement with the work piece to work it thereby exerting a thrust on the work piece having a large component vertically upward, a guide for the slide in a horizontal plane below the work spindle, a guide for the slide in a horizontal plane above the work spindle, the slide having an extension thereon, movable therewith, arranged in the general direction of the work spindle, and slidably supported on said upper guide, a structural frame member rising from the main frame and carrying said upper guide, and a rigid strut member depending from said slide extension and supportingly engaging the free end of the work spindle and adapted to transmit said thrust into said slide extension and thence through said upper guide into said frame member, the strut member being slidably movable on said slide extension in a direction parallel to said work spindle.

24. In apparatus of the class described, a main frame, a slide reciprocatably mounted on the frame, a work spindle extending out of the slide, supported thereon, and adapted to support a work piece on its free end, a tool spindle on the frame, a tool on the tool spindle below the work piece, operative mechanism to move the tool into engagement with the work piece to work it thereby exerting a thrust on the work piece having a large component vertically upward, a guide for the slide, a second guide for the slide in a horizontal plane above the work spindle, the slide having an extension thereon, movable therewith, arranged in the general direction of the work spindle, and slidably supported on said upper guide, a structural frame member rising from the main frame and carrying said upper guide, and a rigid strut member depending from said slide extension and supportingly engaging the free end of the work spindle and adapted to transmit said thrust into said slide extension and thence through said upper guide into said frame member.

25. In apparatus of the class described, a main frame, a slide reciprocatably mounted on the frame, a work spindle extending out of the slide, supported thereon, and adapted to support a work piece on its free end, a tool spindle on the frame, a tool on the tool spindle below the work piece, operative mechanism to move the tool into engagement with the work piece to work it thereby exerting a thrust on the work piece having a large component vertically upward, a guide for the slide, a second guide for the slide in a horizontal plane above the work spindle, the slide having an extension thereon, movable therewith, arranged in the general direction of the work spindle, and slidably supported on said upper guide, a structural frame member rising from the main frame and carrying said upper guide, and a rigid strut member depending from said slide extension and supportingly engaging the free end of the work spindle and adapted to transmit said thrust into said slide extension and thence through said upper guide into said frame member, the strut member being slidably movable on said slide extension in a direction parallel to said work spindle.

In testimony whereof, I have hereunto subscribed my name.

CHARLES H. SCHURR.